United States Patent
Gandy

(10) Patent No.: US 9,702,157 B1
(45) Date of Patent: Jul. 11, 2017

(54) ABOVE GROUND POOL

(71) Applicant: Ryan Clifton Gandy, Ocala, FL (US)

(72) Inventor: Ryan Clifton Gandy, Ocala, FL (US)

( * ) Notice: Subject to any disclaimer, the term of this patent is extended or adjusted under 35 U.S.C. 154(b) by 0 days.

(21) Appl. No.: 14/727,211

(22) Filed: Jun. 1, 2015

(51) Int. Cl.
*E04H 4/14* (2006.01)
*F16B 5/00* (2006.01)

(52) U.S. Cl.
CPC ............. *E04H 4/14* (2013.01); *F16B 5/0056* (2013.01)

(58) Field of Classification Search
CPC ................................ E04H 4/14; F16B 5/0056
USPC .............................................................. 4/506
See application file for complete search history.

(56) References Cited

U.S. PATENT DOCUMENTS

| 5,791,099 A | 8/1998 | Duffy |
| 8,381,325 B2 * | 2/2013 | Tassone, Jr. .......... E04H 4/0043 4/506 |

\* cited by examiner

*Primary Examiner* — Tuan N Nguyen
(74) *Attorney, Agent, or Firm* — Lawrence J. Gibney; Mitchell Ghaneie

(57) ABSTRACT

This application teaches the construction of an above ground pool with minimal labor and time. The actual construction can be accomplished by one person. Through use of a series of interlocking panels, and rods to secure the panels in place the construction of a pool can be accomplished. Additionally the use of an outer skin provides both an aesthetic compliment as well as additional integrity to the structure of the pool.

31 Claims, 13 Drawing Sheets

ABOVE GROUND POOL

BACKGROUND OF THE INVENTION

A. Field of the Invention

The present invention relates to the construction and assembly of above ground pools so that it can be accomplished with only one person.

B. Prior Art

Many pool contractors and homeowners have been tasked with the job of assembling an above ground pool to add on to the backyard. However, there have been numerous issues and problems arising out of constructing the above ground pool. The first problem is that the current method of construction requires a minimum of two people to construct the pool. Although the idea of using panels to construct an above ground pool is largely understood in the industry, there is not a product or method available to the public that would enable one to construct an above ground pool single handedly.

Furthermore, the pools available to the public and disclosed in patents, patent application publications, and publications are not meant to be built and disassembled multiple times.

The U.S. Pat. No. 5,791,099, by Duffy, describes an above ground pool fabricated with pre-manufactured panels. Duffy is distinguished from the presented application in that it does not have two rows of panels, but rather only one row. In addition, the panels in Duffy are taught to attach to each other with a tongue and groove assembly only.

The present invention uses tabs, slots, through-holes, rods and a reinforcing outer skin to attach the panels together and give the pool structural integrity and cosmetic appeal at the same time. In addition, the present invention does not use a track to hold the panels in place which is necessary for various above ground pools sold to the public today.

BRIEF SUMMARY OF THE INVENTION

The present invention has resulted from a substantial number of prior art issues ranging from construction of the pool walls to the durability of the pool over long periods of time. The pool being proposed in the present application is intended to decrease the costs of pool construction while also increasing the pool's durability.

The majority of circular pools sold today require a track that is laid on the ground; the pool structure is placed on the track while the pool is being constructed. The use of the track drastically reduces the durability of the above ground pool, especially if the pool is constructed and disassembled multiple times and the inevitable wear and tear that results from assembling and disassembling a structure. The present invention addresses this issue and is intended to provide an option to consumers that does not exist in the market place today.

The pool being disclosed in this application is intended to be assembled and disassembled many times, so that it may be rented for parties or events and then returned potentially the same day. It is also designed to be a premium durable product for long term ownership, if desired.

In essence, the invention is comprised of multiple panels that are connected side-by-side in order to produce a circular pool and once assembled can accommodate different designs on its exterior outer skin to lend aesthetic appeal. The panels are pre-fabricated and connect with a tab and slot assembly coupled with a rod and through-hole assembly. The tabs, slots and through-holes are pre-fabricated as part of the panel.

The panels would also have a cove that is pre-fabricated as part of the panel. The cove, which is found in all above ground pool, is a reinforced part of the pool near the bottom of the pool. The cove is at the bottom of the interior of the pool and gives the pool added strength at the bottom of the interior of the pool.

In many above ground pools sold today the cove is often damaged thereby causing the walls of the pool to be damaged or moved off the track that is used in the prior art. Some coves are made of dirt that is shoveled up against the above ground pool wall and some coves are made of foam and laid around the bottom inner edge of the above ground pool.

At the opposite end of the cove is the top surface of the wall. On the top surface of the wall panel a removable top rail will be included. This will allow the end user to customize the particular look of this type of pool. For instance, the pattern on the removable panel may match the color on the deck that surrounds a pool. Additionally, the removable panel will make the manufacture of the panels less complicated.

A beaded receiver will be built into the top rails as well. This will be used for the pool liner, which is used in all above ground pools. Having the beaded receiver built into the panels streamlines construction time and enhances the durability of the pool. Furthermore, it allows the owner to switch out liners in the pool more easily.

NUMBERING REFERENCE

5—Pool
10—First Panel

15—Second Panel
20—Interior Construction of Panel
25—Tab
30—Slot
35—Through-Hole
36—Recessed Portion of the Through Hole
40—Cap
45— Rod
50—Cove
55—Beaded Receiver
60—Interior Flange
65—Overlapped Area
110—First Panel with Tabs and Slots
115—Second Panel with Tabs and Slots
120—Top Rail
121—First Wall Panel
122—Second Wall Panel
125—Tongue
130—Groove
135—Top Rail Tab
140—Top Rail Slot
145—First Wall Panel with Tabs and Slots
150—Second Wall Panel with Tabs and Slots

DETAILED DESCRIPTION OF THE EMBODIMENTS

This application is comprised of four embodiments. Each embodiment discloses a different apparatus and method for at least one person to construct a pool. The pool is uniquely manufactured so that it may be constructed by a single person. This is unique from all other above ground pools today, which require at least two individuals for construction.

Figure 1:
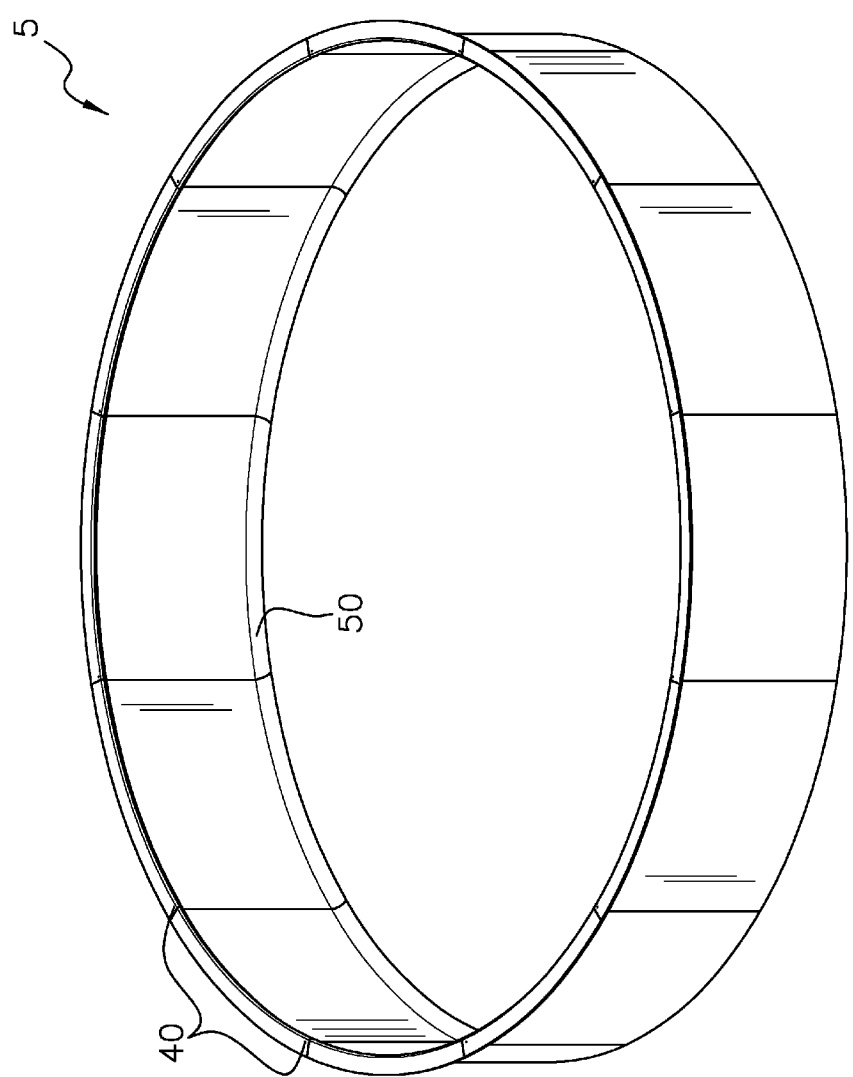
FIG. 1 is an isometric view of an above ground pool according to the first embodiment.
Figure 2:
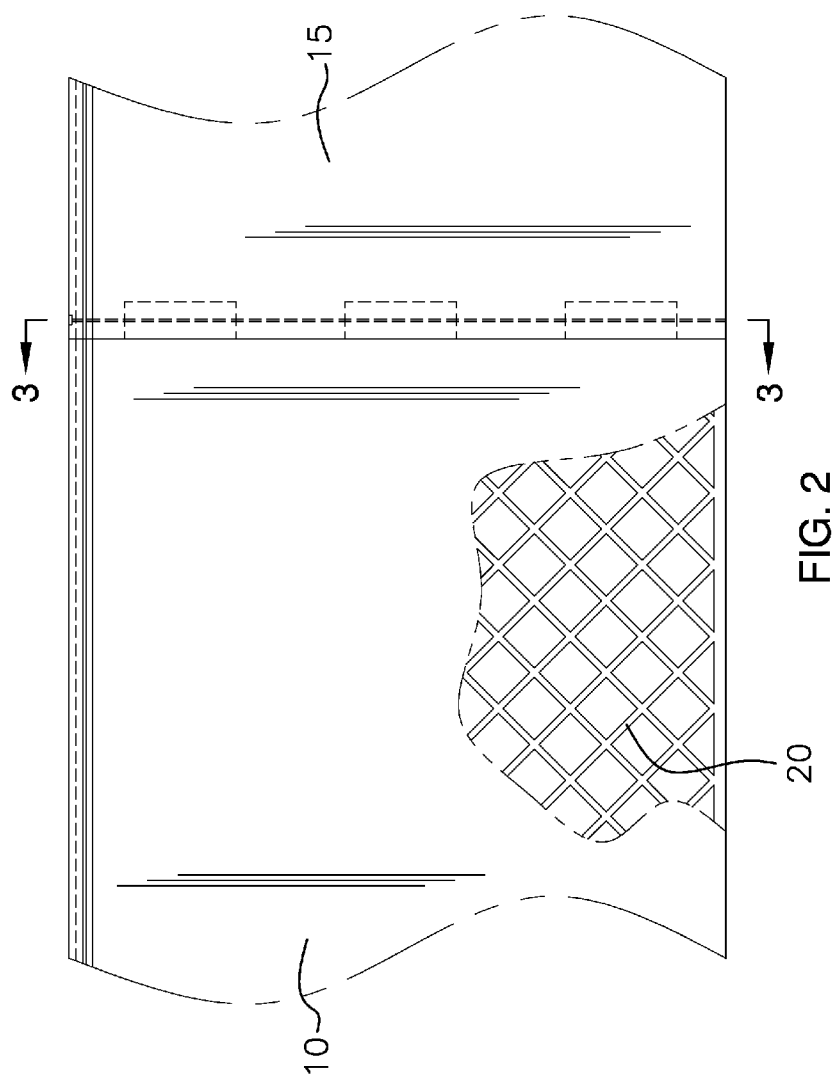
FIG. 2 is a fragmented view of the panels with a cross section of the interior of a panel depicting one rod construction according to the first embodiment.

For purposes of this application the pool will be an above ground pool and its wall will be circular, which is a very common shape for above ground pools such as depicted in FIG. 1. However, it is contemplated that the panels can be used to make various other shapes of above ground pools, such as but not limited to, oval or kidney shaped pools. It is additionally contemplated that while the pool described herein will primarily be used for residential purposes, it may also be used for industrial or commercial purposes. The first through fourth embodiments are described respectively below. The panels are manufactured with a honeycomb interior construction 20 to provide added strength to the panel while reducing the weight of each panel.

First Embodiment

The device 5 is an above ground pool. The device may also be built by either an above ground pool company or a homeowner. The above ground pool is comprised of a plurality of pool panels and a liner (not depicted). Pool liners are common in the prior art and no specific liner is contemplated or claimed. A liner is used in all above ground pools.

Each panel is comprised of tabs 25, slots 30, through-holes 35, a cove 50, a beaded receiver 55, and an interior flange portion 60 of the panel that mates with a corresponding overlapped portion 65 of the opposite panel on the interior of the pool. This construction provides added strength. A gasket material is added to both surfaces to insure that the pool is watertight. The top portion of the through-hole is slightly recessed 36 to accommodate a cap 40 so that the rod 45 is hidden from view during normal use. The recessed hole also permits an individual to retract the rod 45 to dissemble the pool.

Figure 3:
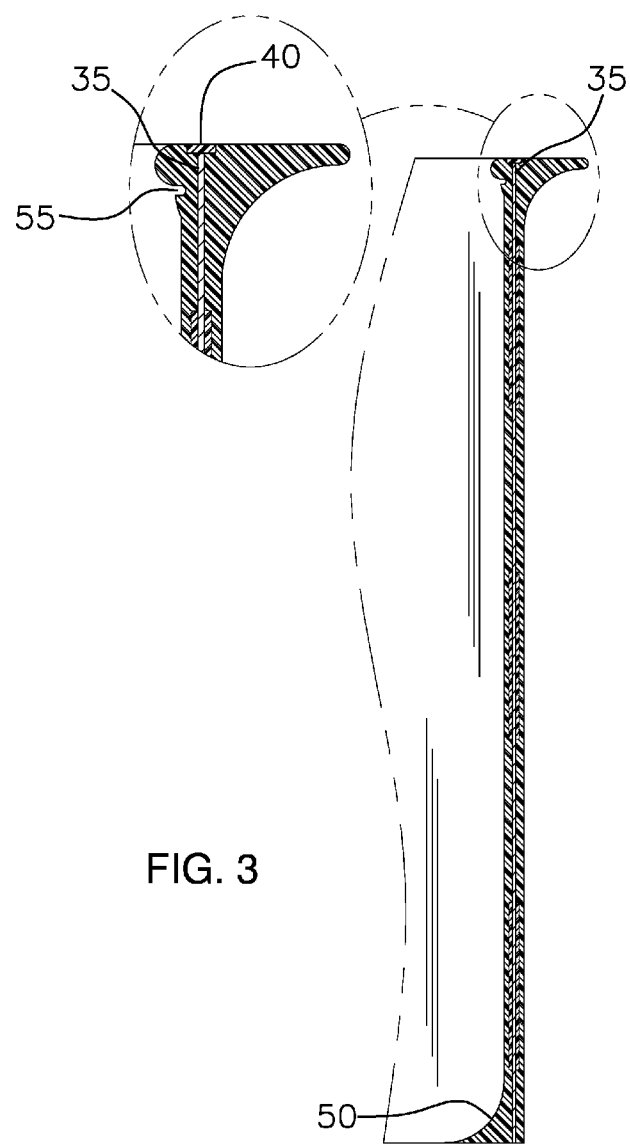
FIG. 3 is a fragmented cross-sectional view according to line 3-3 on FIG. 2.
Figure 4:
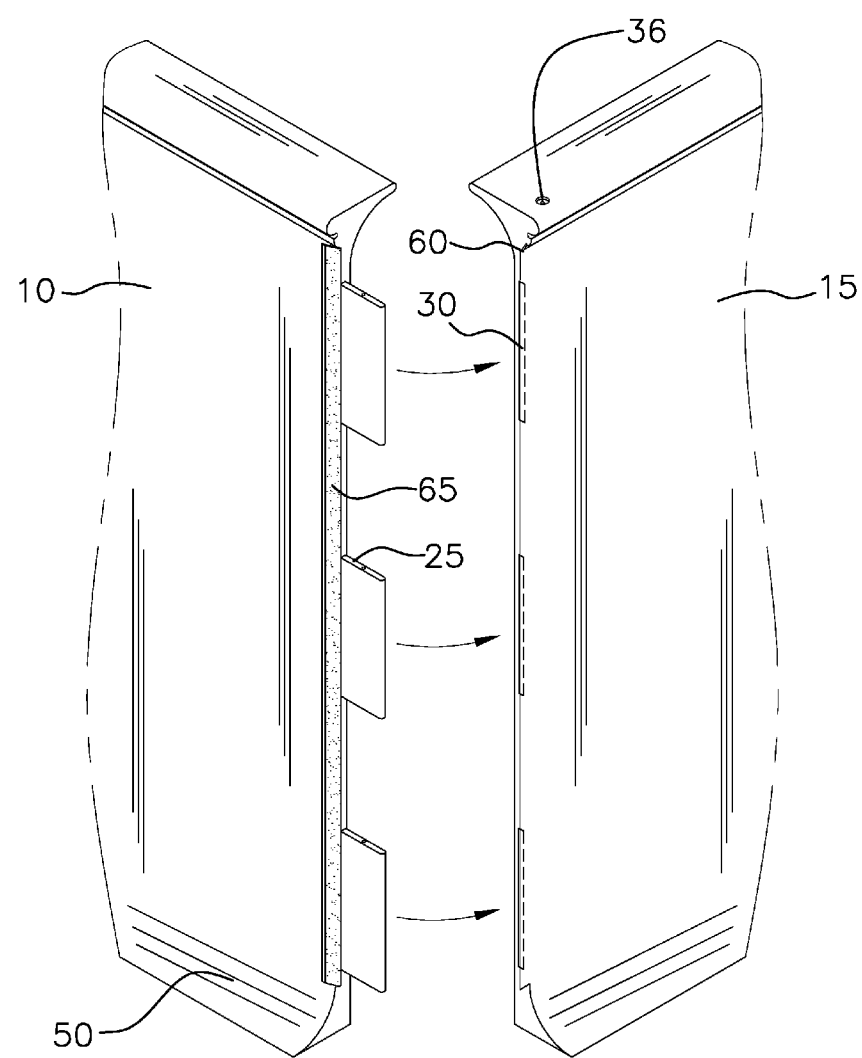
FIG. 4 is a fragmented isometric view of a panel with tabs and a panel with slots according to the first embodiment.
Figure 5:
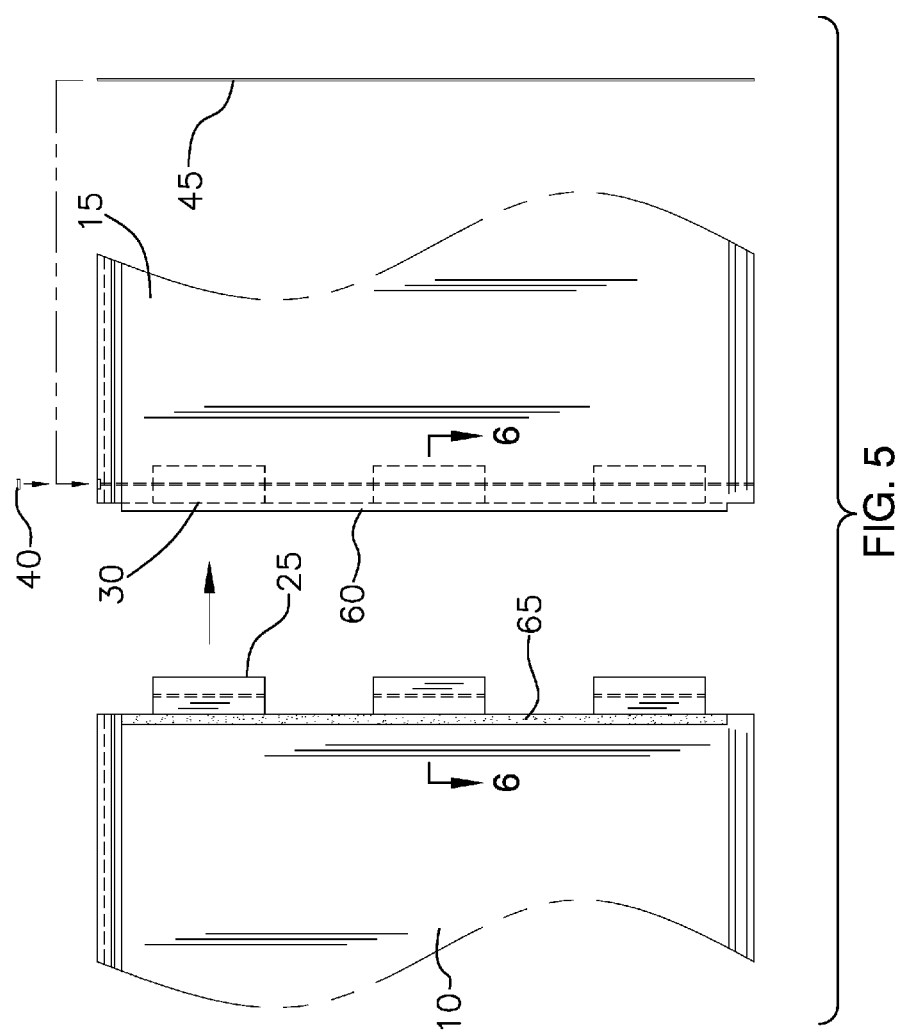
FIG. 5 is a fragmented exploded frontal view of a panel with tabs and a panel with slots according to the first embodiment.
Figure 6:
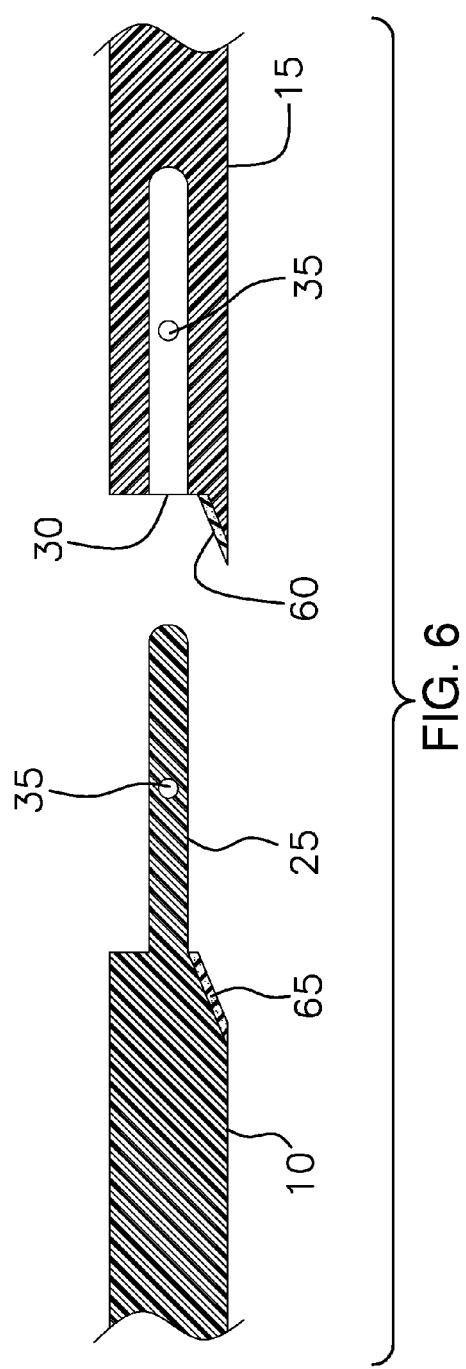
FIG. 6 is a cross-sectional view according to line 6-6 on FIG. 5.

A first panel 10 and a second panel 15, each having a first side and a second side, are provided. Slots 30 are provided on the first side of both panels 10 and 15. Tabs 25 are provided on the second side of both panels 10 and 15. The second side of the first panel 10 will mate with the first side of the second panel 15 as shown in FIG. 4. The tab of the first panel is designed to fit within the slot that is provided on a corresponding second panel. Each tab 25 and slot 30 has a through-hole 35 as depicted in FIG. 3. Each through-hole 35 aligns and creates a cylindrical hole, which runs from the top of the panels to just above the bottom of the panels, through the tabs and slots. A rod 45 is placed inside the cylindrical hole. The rod 45 is intended to reinforce the strength of the panels' connection, thereby helping to insure the integrity of the pool while used. A cap 40 is then placed on top surface of the panel, to reduce potential injuries and snags on swim wear as well as for cosmetic appeal.

The tab and slots panel construction are significant to permit the pool to be constructed with only one individual. The tab and slots would allow one person to initially construct portions of the pool wall. After connecting several pieces together with the tabs and slots, the rods can be placed to hold the panels together more securely. The builder may then add the pool panels accordingly until the pool is constructed.

The use of tabs, slots, rods, and through-holes make it unique in that it can be easily constructed and deconstructed multiple times while still remaining structurally sound.

A liner is then placed in the pool by attaching it to the beaded receiver 55. When the liner is installed it will cover the extended portion and the recessed portion of the panels as well as the cove of the pool.

Additionally, a picture or print can be placed on an outside skin of the pool as well. The skin could be manufactured to also provide some additional structural integrity to the pool.

Second Embodiment

Figure 7:
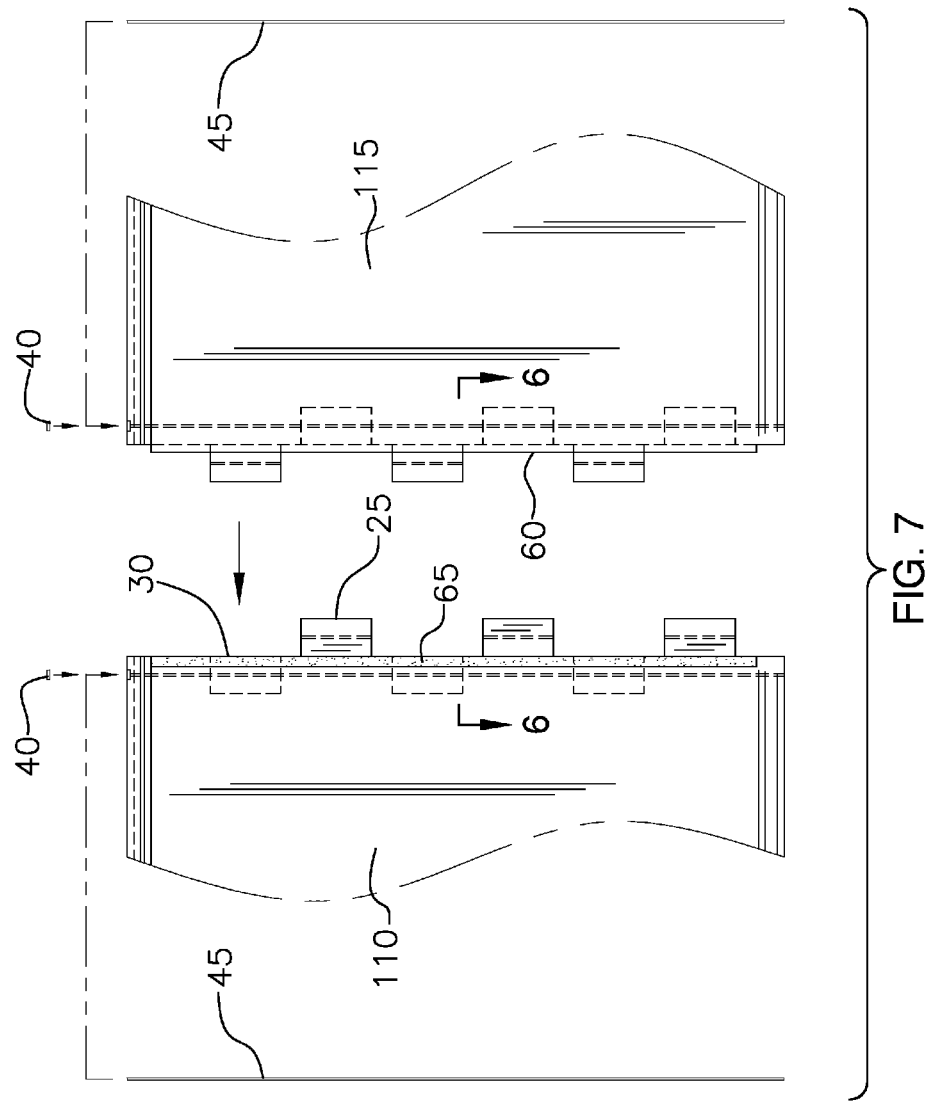
FIG. 7 is a fragmented frontal view of the second embodiment where each panel has a set of tabs and a set of slots.
Figure 8:
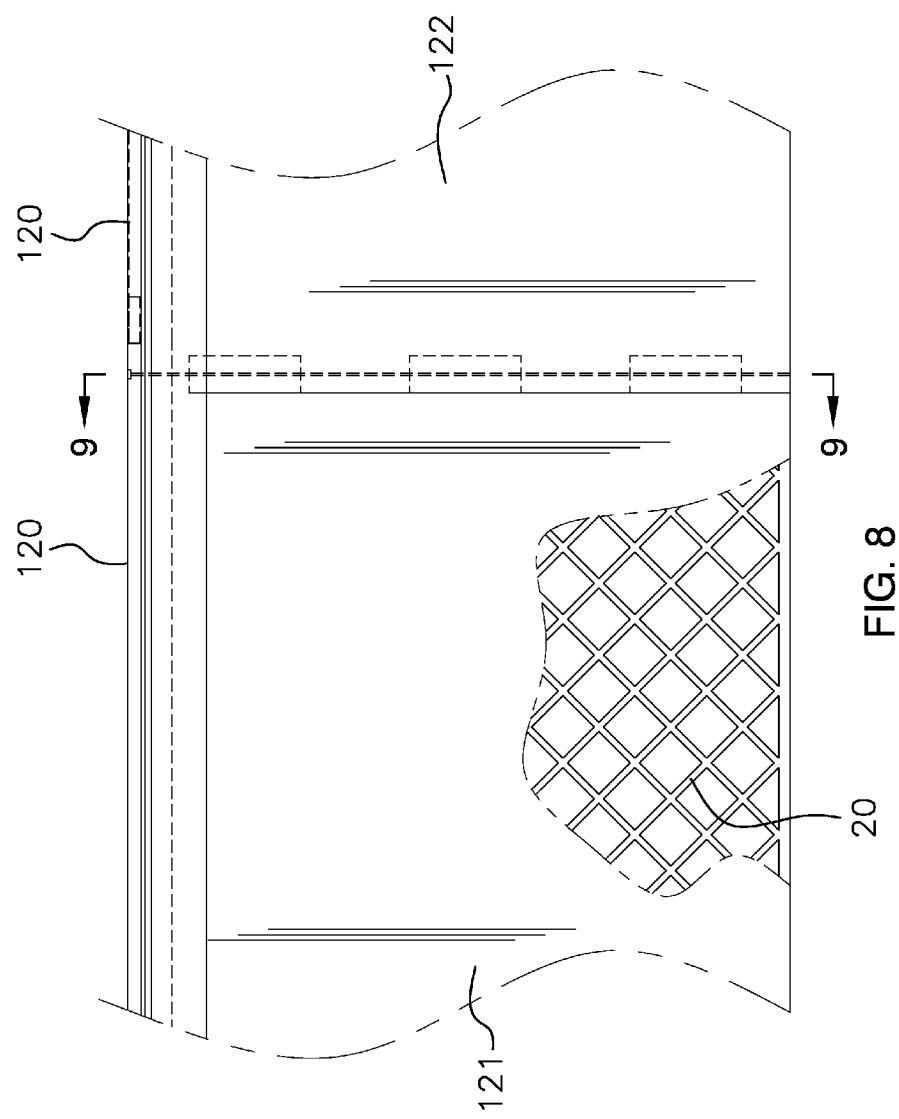
FIG. 8 is a fragmented view of the panels with a cross section of the interior of a panel depicting one rod construction combined with a removable top rail.
Figure 9:
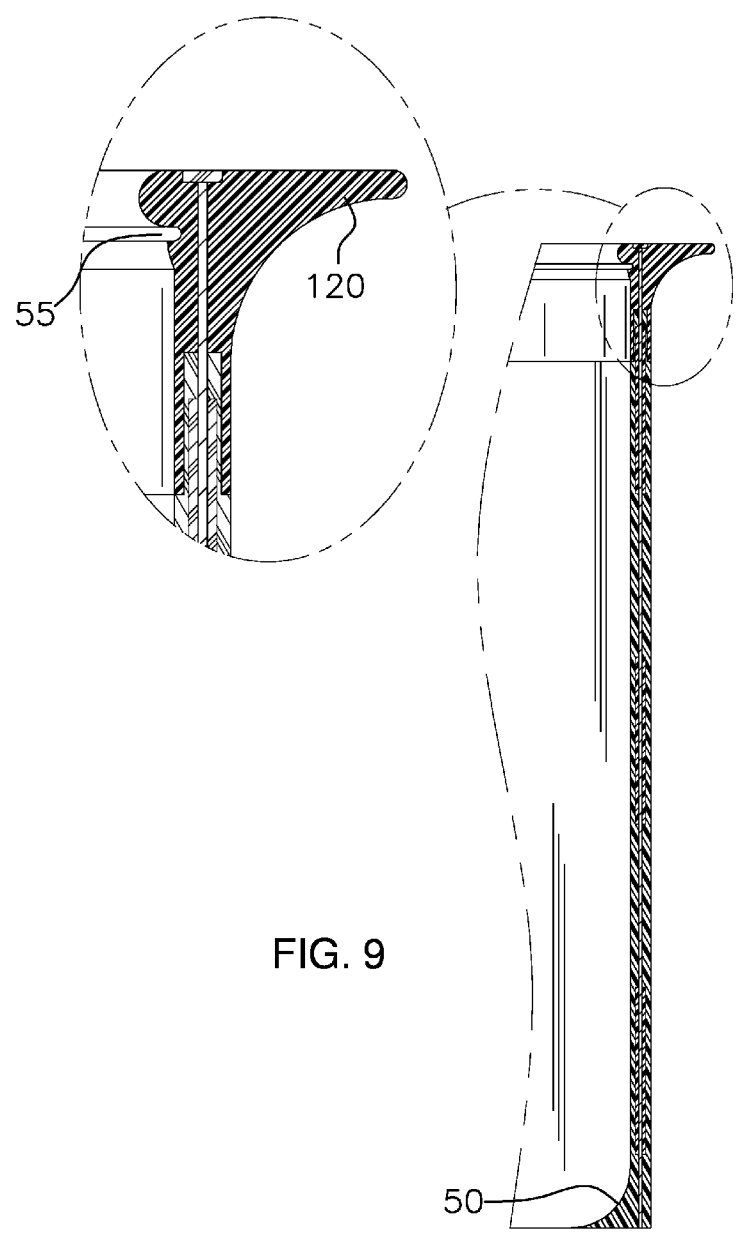
FIG. 9 is a cross-sectional view according line 9-9 on FIG. 8.
Figure 10:
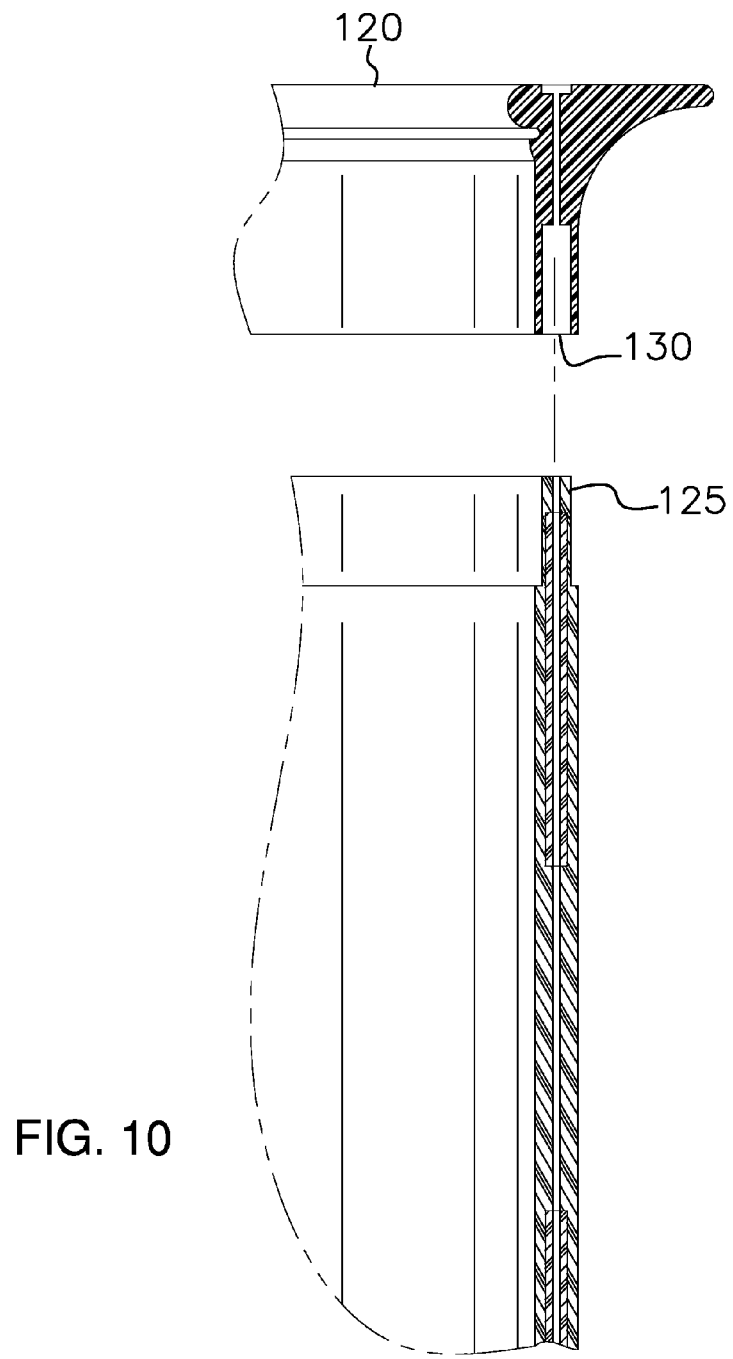
FIG. 10 is a fragmented exploded cross-sectional view of the third embodiment, showing how the top rail connects to the panel.

In this second embodiment, the above ground pool panels such as shown in FIG. 7 is comprised of a first panel 110 and a second panel 115. Each panel has both tabs 25 and slots 30, each alternating down the length of each side of the panel.

There are through-holes 35 in each tab and slot attached to the first panel 110 and through-holes 35 in each tab and slot attached to the second panel 115. When the first panel and second panel are joined together the through-holes align, thereby creating a hole that extends from the top surface to the bottom of the panel. A pair of rods 45 are placed in each cylindrical hole to complete the attachment of the two panels. This is then repeated until the panels create a circle.

The central idea of using multiple tabs and slots with through-holes, which align to create a larger cylindrical hole, with the use of rods remains the same in this embodiment. Additionally, the use of a pair of rods will further increase the structural integrity of the pool.

Third Embodiment

In this third embodiment the device 5 is comprised of a plurality of pool wall panels, a liner (not depicted), and a top rail 120. Each wall panel is comprised of tabs 25, slots 30, through-holes 35, a cove 50, a tongue 125, and an extended portion 60 of the panel that mates with a corresponding recessed portion 65 of the opposite panel on the interior of the pool. This construction provides added strength. A gasket material is added to both surfaces 60 and 65 to insure that the pool is watertight.

Figure 11:
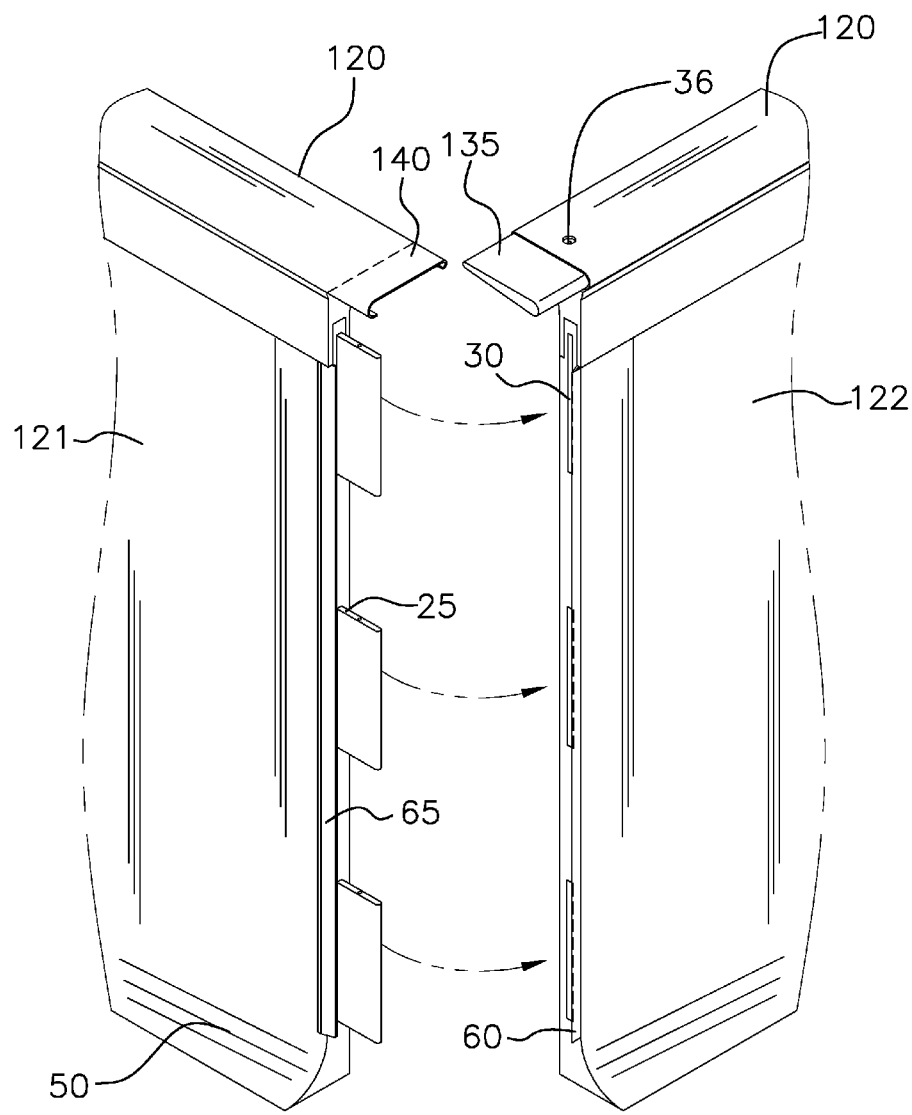
FIG. 11 is a fragmented isometric view of a first wall panel, second wall panel, and each of the panels having a removable top rail according to the third embodiment.
Figure 12:
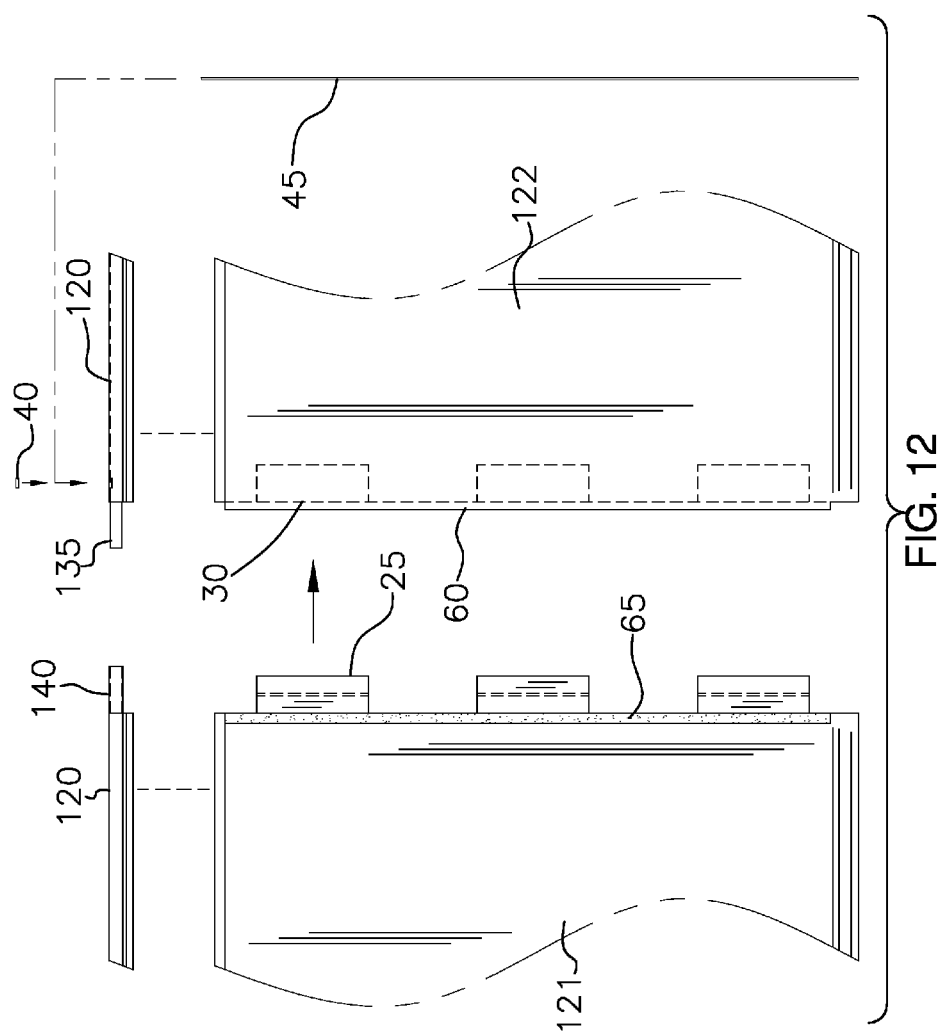
FIG. 12 is a fragmented exploded frontal view of a panel with tabs, a panel with slots, and each panel having a removable top siding according to the third embodiment.
Figure 13:
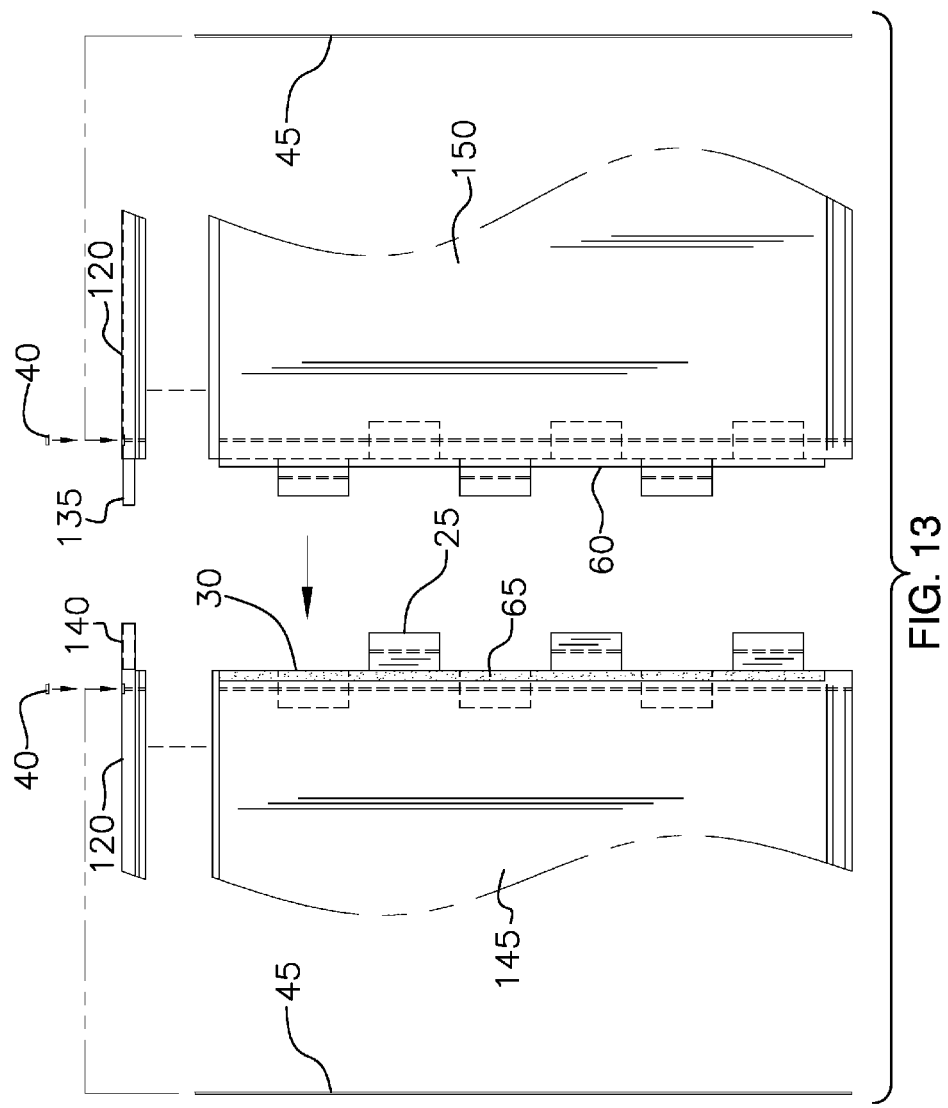
FIG. 13 is a fragmented frontal view of the fourth embodiment where each panel has a set of tabs, a set of slots, and a removable top siding.

The plurality of pool wall panels is further comprised of a first panel 121 and a second panel 122, each having a first side and a second side. Slots 30 are provided on the first side of both panels 121 and 122. Tabs 25 are provided on the second side of both panels 121 and 122. The second side of the first panel 121 will mate with the first side of the second panel 122 as shown in FIG. 11.

Each top rail is comprised of a beaded receiver 55, a groove 130, a top rail tab 135, a top rail slot 140, a through-hole 35, and a recessed portion of the through-hole 36. This top rail is intended to be manufactured separately from the plurality of wall panels in order to help reduce manufacturing costs and streamline production. Additionally, the end user would have the option to buy a top rail that aesthetically matches the surroundings of the area to which the pool would be placed.

The top rail's groove 130 fits flush up against the tongue 125 of the wall panel as shown in Figure ii. The top portion of the through-hole 36 is slightly recessed to accommodate a cap 40. The top rail tab 135 and top rail slot 140 are located at opposing ends of the top rail 120. The top rail tab 135 of a first top rail is designed to fit within the top rail slot 140 that is provided on a corresponding second top rail. The recessed hole 36 also permits an individual to retract the rod 45 to dissemble the pool.

The wall panel 121 will fit into and flush up against the wall panel 122. The tab 25 of a first wall panel 121 is designed to fit within the slot 30 that is provided on a corresponding second wall panel 122. Each tab 25 and slot 30 has a through-hole 35. Each through-hole 35 aligns and creates a cylindrical hole, which runs from the top rail 120 to just above the bottom of the plurality of wall panels. A rod 45 is placed inside the cylindrical hole. The rod 45 is intended to reinforce the strength of the wall panels' connection, thereby helping to insure the integrity of the pool while used. A cap 40 is then placed on top of the rod 45 and inside the recessed hole 36, to reduce potential injuries and snags on swim wear.

The tab and slot wall panel construction coupled with the tongue and groove top rail and wall panel construction are significant to permit the pool to be constructed with only one individual. The tabs 25 and slots 30 would allow one person to initially construct portions of the pool wall. After connecting several pieces together with the tabs and slots, the top rails can be slipped onto the wall panels. Next, the rods 45 can be placed in to hold the plurality of wall panels and top rails 120 together more securely. The builder may then add the pool wall panels and top rail sections accordingly until the pool is constructed.

The use of tabs, slots, tongues, grooves, rods, and through-holes make it unique in that it can be easily constructed and deconstructed multiple times while still remaining structurally sound.

A liner is then placed in the pool by attaching it to the beaded receiver. When the liner is installed it will cover the extended portion and the recessed portion of the panels as well as the cove of the pool.

Additionally, a picture or print can be placed on an outside skin of the pool as well. The skin could be manufactured to also provide some additional structural integrity to the pool.

Fourth Embodiment

In this fourth embodiment, the above ground pool panels such as shown in FIG. 14 is comprised of a first wall panel 145, a second wall panel 150, and a top rail 120. Each wall panel has both tabs 25 and slots 30, each alternating down the length of the panel, as well as a cove 50, an interior flange 60, an overlapped area 65, and a tongue 125. There are also through-holes 35 in each tab and slot attached to the first panel 145 and through-holes 35 in each tab and slot attached to the second panel 150.

Each top rail is comprised of a beaded receiver 55, a groove 130, a top rail tab 135, a top rail slot 140, through-holes 35, and a recessed portion of each through-hole 36. The groove located on the top rail slides over the tongue of the panel wall. As described in the third embodiment, the top rail fits together with other corresponding top rails.

When the first wall panel, second wall panel, and top rail 120 are joined together the through-holes 35 align, thereby creating a cylindrical hole that extends from the top surface to the bottom of the panel. A pair of rods 45 are placed in each cylindrical hole to complete the attachment of the two panels. This is then repeated until the panels create a circle. The central idea of using multiple tabs and slots with through-holes, which align to create a larger cylindrical hole, with the use of rods remains the same in this embodiment, although the use of a pair of rods will increase the structural integrity of the pool.

While the embodiments of the invention have been disclosed, certain modifications may be made by those skilled in the art to modify the invention without departing from the spirit of the invention.

The inventor claims:

1. An above ground pool comprised of:
   a. a plurality of panels;
      wherein said plurality of panels is further comprised of a first panel and a second panel;
      wherein said plurality of panels is of a predetermined shape;
      wherein said plurality of panels is prefabricated;
      wherein the first panel has a first side and a second side;
      wherein a plurality of slots is manufactured on the first side of said first panel;
      wherein a plurality of tabs is manufactured on the second side of said first panel;
      wherein the second panel has a first side and a second side;
      wherein a plurality of slots is manufactured on the first side of said second panel;
      wherein a plurality of tabs is manufactured on the second side of said second panel;
      wherein said tabs of the second side of the first panel mate with the slots of the second panel;
      wherein a plurality of through-holes is provided on the plurality of panels;
      wherein at least one of the plurality of through-holes is provided on each tab of the plurality of tabs;
      wherein said plurality of panels is prefabricated with a cove;
      wherein said plurality of panels is prefabricated with a beaded receiver;
      wherein said plurality of panels is prefabricated with an interior flange;
      wherein said plurality of panels is prefabricated with an overlapped area;
      wherein said plurality of panels is prefabricated with a top rail;
   b. a plurality of rods;
      wherein said plurality of rods is of a predetermined size;

wherein said plurality of rods fits through said plurality of through-holes;
c. a plurality of caps;
wherein said plurality of caps is of a predetermined shape and size;
wherein said plurality of caps fits over said plurality of rods;
d. a plurality of rubber gaskets;
wherein said plurality of rubber gaskets is provided on the plurality of panels.

2. The above ground pool as described in claim 1 wherein said plurality of panels is prefabricated with a honeycomb interior construction.

3. The above ground pool as described in claim 1 wherein at least one of said plurality of through-hole extends from the top of the plurality of panels to the bottom of the plurality of panels.

4. The above ground pool as described in claim 1 wherein an outer skin is provided.

5. The above ground pool of claim 4 wherein the outer skin is of a predetermined shape and provides additional structural integrity.

6. The above ground pool as described in claim 1 wherein said plurality of rubber gaskets provides a water tight connection between the panels.

7. An above ground pool comprised of:
a. a plurality of panels;
wherein the plurality of panels is further comprised of a first panel and a second panel;
wherein said plurality of panels is of a predetermined shape;
wherein said plurality of panels is prefabricated;
wherein the first panel has a first side and a second side;
wherein a set of alternating tabs and slots are provided on said first side of the first panel;
wherein a set of alternating tabs and slots are provided on said second side of the first panel;
wherein the second panel has a first side and a second side;
wherein a set of alternating tabs and slots is provided on the first side of said second panel;
wherein a set of alternating tabs and slots is provided on the second side of said second panel;
wherein each panel has a predetermined number of said alternating tabs and slots;
wherein a plurality of through-holes through-hole is provided on the plurality of panels;
wherein at least one of the plurality of through-holes is provided on each tab of the plurality of tabs;
wherein said plurality of panels is prefabricated with a cove;
wherein said plurality of panels is prefabricated with a beaded receiver;
wherein said plurality of panels is prefabricated with a top rail;
wherein said plurality of panels is prefabricated with an interior flange;
wherein said plurality of panels is prefabricated with an overlapped area;
b. a plurality of rods;
wherein said plurality of rods is of a predetermined size;
wherein said plurality of rods fit through said plurality of through-holes;
wherein a pair of rods are required to connect one panel to another;
c. a plurality of caps;
wherein said plurality of caps are of a predetermined shape and size;
wherein said plurality of caps fits over said plurality of rods;
d. a plurality of rubber gaskets;
wherein said plurality of rubber gaskets are provided on said plurality of panels.

8. A method to assemble an above ground pool as described in claim 7 that is comprised of the following steps:
a. selecting the panel;
b. selecting the opposite panel;
c. aligning the tabs with the slots;
d. aligning the through-holes;
e. inserting the rod through the cylindrical hole;
f. inserting the cap into the recessed hole.

9. The above ground pool as described in claim 7 wherein an outer skin is provided.

10. The above ground pool as described in claim 9 wherein the outer skin is of a predetermined shape and provides structural integrity.

11. The above ground pool as described in claim 7 wherein the set of alternating tabs and slots on the second side of said first panel mate with the set of alternating tabs and slots on the first side of said second panel.

12. The above ground pool as described in claim 7 wherein said plurality of panels are prefabricated with a honeycomb interior construction.

13. The above ground pool as described in claim 7 wherein the plurality of through-holes is provided through the plurality of panels and through the plurality of tabs.

14. The above ground pool as described in claim 7 wherein said plurality of rubber gaskets provides a water tight connection between panels.

15. An above ground pool comprised of:
a. a plurality of wall panels;
wherein the plurality of wall panels is further comprised of a first wall panel and a second wall panel;
wherein said plurality of wall panels is of a predetermined shape;
wherein said plurality of wall panels is prefabricated;
wherein the first wall panel has a first side and second side;
wherein a plurality of slots is manufactured on the first side of said first wall panel;
wherein a plurality of tabs is manufactured on the second side of said first wall panel;
wherein the second wall panel has a first side and a second side;
wherein a plurality of slots is manufactured on the first side of said second wall panel;
wherein a plurality of tabs is manufactured on the second side of said second wall panel;
wherein each wall panel has a recessed surface;
wherein each wall panel has an extended surface;
wherein a plurality of wall panel through-holes is provided on the plurality of wall panels;
wherein at least one of the plurality of wall panel through-holes is provided on each tab of the plurality of tabs;
wherein a tongue is provided on said plurality of wall panels;
wherein said plurality of wall panels is prefabricated with a cove;
wherein said plurality of wall panels is prefabricated with an interior flange;
wherein said plurality of wall panels is prefabricated with an overlapped area;

b. a plurality of top rails;
wherein the plurality of top rails is further comprised of a first top rail and a second top rail;
wherein said plurality of top rails is of a predetermined shape;
wherein said plurality of top rails is prefabricated;
wherein the first top rail has a first end and a second end;
wherein a top rail tab is provided on the first end of the first top rail;
wherein a top rail slot is provided on the second end of the first top rail;
wherein the second top rail has a first end and a second end;
wherein a top rail tab is provided on the first end of the second top rail;
wherein a top rail slot is provided on the second end of the second top rail;
wherein the top rail slot of said second end of the first top rail mates with the top rail tab of said first end of the second top rail;
wherein a beaded receiver is provided on said plurality of top rails;
wherein a groove is provided on said plurality of top rails;
wherein said groove on said plurality of top rails mates with said tongue provided on said plurality of wall panels;
wherein said plurality of top rails is prefabricated with a recessed portion of the through-hole;
wherein said plurality of top rails provide a plurality of top rail through-holes;
c. a plurality of rods;
wherein said plurality of rods is of a predetermined size;
wherein said plurality of rods fits through said plurality of wall panel through-holes and said plurality of top rail through-holes;
said plurality of rods extends from the top rail of the pool to a predetermined point located near the bottom of the pool in the interior of the panels;
d. a plurality of caps;
wherein said plurality of caps is of a predetermined shape and size;
wherein said plurality of caps fits over said rod on the top surface of the pool;
e. a plurality of rubber gaskets;
said plurality of rubber gaskets is placed on the plurality of wall panels.

16. The above ground pool as described in claim 15 wherein said plurality of walls are prefabricated with a honeycomb interior construction.

17. The above ground pool as described in claim 15 wherein said plurality of rubber gaskets provides a water tight connection between panels.

18. The above ground pool as described in claim 15 wherein said plurality of tabs of the second side of the first panel mate with the plurality of slots of the first side of said second panel.

19. The above ground pool as described in claim 15 wherein an outer skin is provided.

20. The above ground pool as described in claim 19 wherein the outer skin is of a predetermined shape and provides additional structural integrity.

21. The above ground pool as described in claim 15 wherein at least two through-holes extend from the top of the plurality of panels to the bottom of the plurality of panels.

22. The above ground pool as described in claim 15 wherein the plurality of wall panel through holes align with the plurality of top rail through holes.

23. An above ground pool comprised of:
a. a plurality of wall panels;
wherein the plurality of wall panels is further comprised of a first wall panel and a second wall panel;
wherein said plurality of wall panels is of a predetermined shape;
wherein the first wall panel has a first side and a second side;
wherein a set of alternating tabs and slots are provided on said first side of the first wall panel;
wherein a set of alternating tabs and slots are provided on said second side of the first wall panel;
wherein the second wall panel has a first side and a second side;
wherein a set of alternating tabs and slots are provided on the first side of said second wall panel;
wherein a set of alternating tabs and slots are provided on the second side of said second wall panel;
wherein each wall panel has a predetermined number of said alternating tabs and slots;
wherein a plurality of wall panel through-holes is provided on the plurality of wall panels;
wherein said plurality of wall panel through-hole extends from the top of the plurality of wall panels to the bottom of the plurality of wall panels;
wherein at least one of said plurality of wall panel through holes are provided on the plurality of tabs;
wherein said plurality of wall panels is prefabricated with a cove;
wherein said plurality of wall panels is prefabricated with a tongue;
wherein said plurality of wall panels is prefabricated with an interior flange;
wherein said plurality of wall panels is prefabricated with an overlapped area;
b. a plurality of top rails;
wherein the plurality of top rails is further comprised of a first top rail and a second top rail;
wherein said plurality of top rails is of a predetermined shape;
wherein said plurality of top rails is prefabricated;
wherein the first top rail has a first end and a second end;
wherein a top rail tab is provided on the first end of said first top rail;
wherein a top rail slot is provided on the second end of the first top rail;
wherein the second top rail has a first end and second end;
wherein a top rail tab is provided on the first end of the second top rail;
wherein a top rail slot is provided on the second end of the second top rail;
wherein the top rail slot of said second end of the first top rail mates with the top rail tab of said first end of the second top rail;
wherein a groove is provided on said plurality of top rails;
wherein said groove on said plurality of top rails mates with said tongue provided on said plurality of wall panels;
wherein a beaded receiver is provided on said plurality of wall panels;

wherein said top rail contains a recessed portion of the through-hole;
wherein said plurality of top rails provide a plurality of top rail through-holes;
c. a plurality of rods;
wherein the plurality of rods is of a predetermined size;
wherein said plurality of rods fits through said plurality of through-holes of said plurality of wall panels and said plurality of top rail through-holes;
wherein a pair of rods are required to connect one wall panel to another;
d. a plurality of caps;
wherein said plurality of caps are of a predetermined shape and size;
wherein said plurality of caps fits over said rods;
e. a plurality of rubber gaskets;
wherein said plurality of rubber gaskets is provided on said plurality of wall panels.

24. A method to assemble an above ground pool as described in claim 23 that is comprised of the following steps:
a. selecting the wall panel;
b. selecting the opposite wall panel;
c. aligning the tabs with the slots;
d. selecting the top rail;
e. placing the groove of the top rail over the tongue of the wall panel
f. aligning the through-holes;
g. inserting the rod through the through-hole.

25. The above ground pool as described in claim 23 wherein said plurality of walls are prefabricated with a honeycomb interior construction.

26. The above ground pool as described in claim 23 wherein said plurality of rubber gaskets provides a water tight connection between panels.

27. The above ground pool as described in claim 23 wherein an outer skin is provided.

28. The above ground pool as described in claim 27 wherein the outer skin is of a predetermined shape and provides additional structural integrity.

29. The above ground pool as described in claim 23 wherein the plurality of wall panel through-holes is provided through the plurality of wall panels and through the plurality of tabs.

30. The above ground pool as described in claim 23 wherein the set of alternating tabs and slots on the second side of said first panel mate with the set of alternating tabs and slots on the first side of said second panel.

31. The above ground pool as described in claim 23 wherein the plurality of wall panel through holes align with the plurality of top rail through holes.

* * * * *